Oct. 17, 1961  A. E. BRATT  3,004,809
THRUST ROLLER BEARINGS
Filed Dec. 19, 1957

INVENTOR:
AXEL ERLAND BRATT
BY Howson & Howson
ATTYS.

United States Patent Office 3,004,809
Patented Oct. 17, 1961

3,004,809
THRUST ROLLER BEARINGS
Axel Erland Bratt, Goteborg, Sweden, assignor to Aktiebolaget Svenska Kullagerfabriken, Goteborg, Sweden, a corporation of Sweden
Filed Dec. 19, 1957, Ser. No. 703,780
1 Claim. (Cl. 308—227)

In order to interconnect the set of rollers and one of the race rings of a self-aligning thrust roller bearing to form a self-contained unit to facilitate the handling of the bearing, for instance during mounting, it has been proposed to provide a sleeve mounted in a seat in the bore of one of the race rings, which sleeve at the same time serves to center the cage and hold the cage, the set of rollers, and the race ring together. This device, however, has the disadvantage that it is comparatively expensive to manufacture.

The present invention relates to a thrust roller bearing in which the sleeve can be dispensed with and in which the cage can be made from sheet metal, whereby the design will be much cheaper.

The invention is applicable to thrust roller bearings having rollers the axes of which are disposed obliquely relative to the axis of the bearing, the said rollers being located between a shaft race ring having a flange only at the outer ends of the rollers and a housing race ring, there being a cage with a substantially conical portion located outside the axes of the rollers and having roller pockets the peripheral dimensions of which are less than the roller diameter, and is characterized mainly by a substantially cylindrical extension of the cage encircling the shaft race ring, at least portions of the edge of said extension being bent around a circular edge on the outer periphery of the shaft race ring, the outer cylindrical surface of said extension being smaller in diameter than the diameter of the housing race ring.

The invention is illustrated on the accompanying drawing, wherein.

Figure 1:
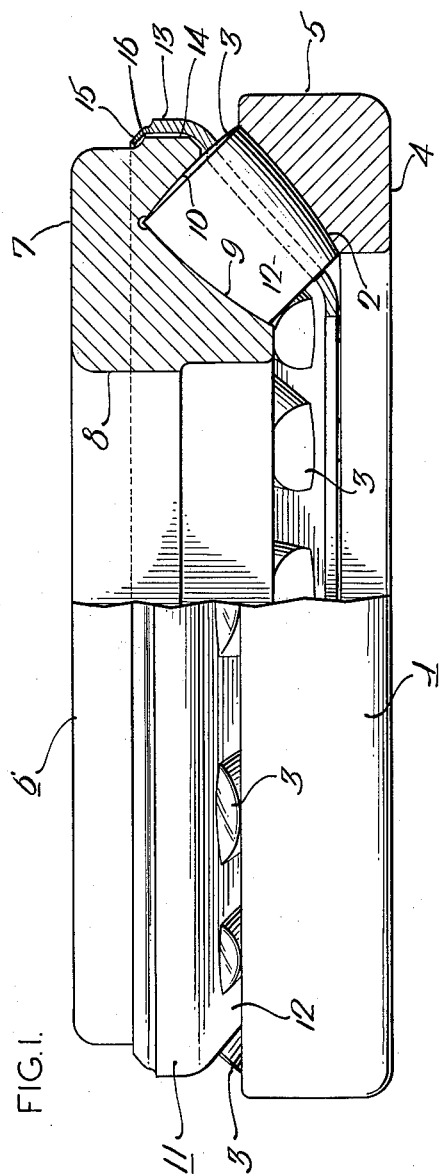
FIG. 1 shows an edge elevational view of a bearing partly in axial section.

In the form of the invention illustrated the numeral 1 indicates a housing race ring for mounting in a housing and having a spherical raceway 2 for the rollers 3. It has a plane surface 4 and a cylindrical outer surface 5 to fit the seat in a bearing housing. The shaft race ring 6 has a plane surface 7 and a cylindrical bore 8 for mounting on a shaft. The shaft race ring is provided with a race 9 for the rollers and a flange 10 against which the outer roller ends abut and which guides the rollers. The rollers are separated from each other by a cage 11 of sheet metal. The cage has a conical portion 12 in which are pockets, the dimension of which in the peripheral direction is less than the diameter of the rollers. The conical portion 12 of the cage is located outside of the axes of the rollers. The cage also has a cylindrical portion 13 the inner diameter of which is somewhat greater than the outer diameter of the shaft race ring 6 to enable it to be mounted around the shaft race ring as shown in the drawing. In order that this design may be used to the greatest possible extent, the diameter of the outer cylindrical surface 14 of the shaft race ring 6 must be made somewhat less than in earlier designs to enable the cylindrical portion of the cage to have an outer diameter somewhat less than that of the cylindrical surface 5 of the housing race ring which terminates short of the flange 10, thereby radially exposing the cylindrical portion 13 of the cage. In certain cases the cage would otherwise prevent the mounting of the housing race ring in the housing.

When assembling the bearing the rollers 3 are first introduced into their pockets after which the set of rollers is applied to the shaft race ring 6 and a flange or inward extension 15 of the cylindrical portion 13 of the cage is turned in over an edge 16 on the shaft race ring 6. The shaft race ring 6, the cage 11 and the rollers 3 are interconnected to form a self-contained unit. As clearly shown in FIG. 1, the cylindrical portion 13 and extension 15 of the cage are spaced from the peripheral surface of the shaft race ring 7, and the pocket ends of the cage engage the outer roller end surfaces so that the cage is supported by the rollers.

Figure 2:
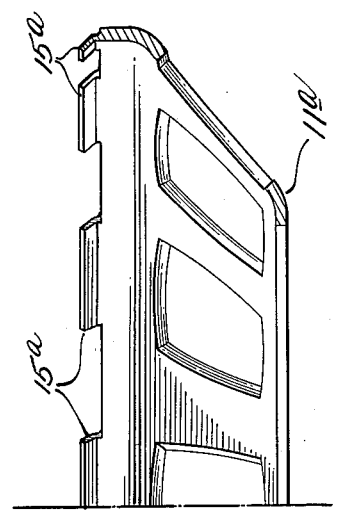
FIG. 2 is a fragmentary view in perspective of the cage illustrating a modification.
Figure 3:
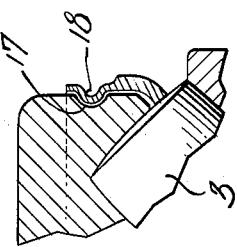
FIG. 3 is a fragmentary axial sectional view of a bearing showing still another modification within the scope of the invention.

Instead of turning in the edge 15 around its entire circumference as in FIG. 1, it is possible to turn in portions of the flange at a plurality of locations about the circumference to form local indentations which may snap behind the shoulder at 16. In addition, the flange 15 may be cut away at a plurality of locations about the circumference forming flexible tongues 15a, as shown in FIG. 2 which snap behind the shoulder. In addition, as shown in FIG. 3, the outer surface of the shaft race ring may be made cylindrical and provided with a circular groove 17 which may receive the flange 15 or an in-pressed edge 18 of the cage, the edge being in-pressed continuously or indented at a plurality of locations. As clearly shown in FIG. 3, the cage including the in-pressed edge 18 is spaced from the peripheral surface of the shaft race ring and the pocket ends of the cage engage the outer roller end surfaces so that the cage is supported by the rollers.

I claim:

A thrust roller bearing wherein the axes of the rollers are disposed obliquely relative to the axis of the bearing, a shaft race ring having a flange only at the outer ends of the rollers, a housing race ring surrounding the inner end of said shaft race ring and terminating short of the race ring flange, rollers located between said rings, a cage having a substantially conical portion located outside of the axes of the rollers and having roller pockets with sidewalls spaced apart less than the roller diameter so as to retain the rollers against outward displacement through said pockets and axial end walls spaced apart so as to retain the roller against axial displacement, and a radially-exposed substantially cylindrical extension on said cage encircling the shaft race ring, portions at least of said extension extending inwardly over a circular edge at the outer periphery of the shaft ring, the cylindrical extension of said cage being spaced from the peripheral surface of the shaft race ring and the pocket ends of the cage engaging the outer roller end surfaces so that the cage is supported by the rollers.

References Cited in the file of this patent

UNITED STATES PATENTS

| | | |
|---|---|---|
| 1,518,731 | Dickinson | Dec. 9, 1924 |
| 2,435,839 | McNicoll | Feb. 10, 1948 |

FOREIGN PATENTS

| | | |
|---|---|---|
| 1,143,860 | France | Apr. 15, 1957 |